United States Patent [19]
Bolen

[11] Patent Number: 5,460,535
[45] Date of Patent: Oct. 24, 1995

[54] TWO-PIECE CLOCKSPRING WITH LOCK AND WIRE HARNESS ASSEMBLY

[75] Inventor: Patrick A. Bolen, Carthage, Ill.

[73] Assignee: Methode Electronics, Inc., Chicago, Ill.

[21] Appl. No.: 196,311

[22] Filed: Feb. 14, 1994

[51] Int. Cl.$^6$ ............................................ H01R 35/04
[52] U.S. Cl. ............................................ 439/164; 439/15
[58] Field of Search .............................. 439/15, 164

[56] References Cited

U.S. PATENT DOCUMENTS

| | | |
|---|---|---|
| 3,713,073 | 1/1972 | Narozny . |
| 3,763,455 | 10/1973 | Confer et al. . |
| 4,417,775 | 11/1983 | Sakurai et al. . |
| 4,586,776 | 5/1986 | Ollis et al. . |
| 4,607,898 | 8/1986 | Reighard et al. ............... 439/15 |
| 4,722,690 | 2/1988 | Priede ............................. 439/15 |
| 4,797,109 | 1/1989 | Wende ............................ 439/15 |
| 4,919,620 | 4/1990 | Yamaguchi et al. ........... 439/164 |
| 4,921,428 | 5/1990 | Sasaki et al. ................... 439/164 |
| 4,927,365 | 5/1990 | Schauer et al. ................ 439/15 |
| 4,928,901 | 5/1990 | Bannai et al. .................. 242/85 |
| 4,936,782 | 6/1990 | Bannai et al. .................. 439/15 |
| 4,966,334 | 10/1990 | Bannai ............................ 439/15 |
| 4,975,064 | 12/1990 | Takahashi et al. ............. 439/15 |
| 5,059,134 | 10/1991 | Schauer et al. ................ 439/164 |
| 5,061,195 | 10/1991 | Bolen ............................. 439/164 |
| 5,100,331 | 3/1992 | Banfelder ....................... 439/15 |
| 5,171,157 | 12/1992 | Bolen ............................. 439/164 |
| 5,205,754 | 4/1993 | Kuramoto ...................... 439/164 |
| 5,248,260 | 9/1993 | Ida et al. ........................ 439/164 |
| 5,256,075 | 10/1993 | Miyahara et al. .............. 439/164 |
| 5,257,943 | 11/1993 | Ueno et al. .................... 439/164 |

FOREIGN PATENT DOCUMENTS

| | | | |
|---|---|---|---|
| 0186935A1 | 7/1986 | European Pat. Off. . | |
| 4027952 | 3/1992 | Germany ....................... | 439/15 |
| 2073961 | 3/1984 | United Kingdom . | |

*Primary Examiner*—Gary F. Paumen
*Attorney, Agent, or Firm*—David L. Newman

[57] ABSTRACT

A clockspring interconnector comprising a housing defining a chamber and a rotor cover attached to the housing. A coiled flat cable carded within the chamber surrounding the rotor cover. The flat cable having a first end attached to a first connector location of the rotor cover and a second end attached to a second connector location of the housing. The rotor cover includes an inner wall defining a central aperture having a top opening and a bottom opening. The inner wall having integral flanges extending from the rotor cover adjacent to the bottom opening. The housing having a center hole having a rim at its external diameter. The rotor cover snap fits to the housing via the flanges having angled surfaces to slide past the rim and a protruding surface to engage the rim of the housing. The first and second end of the flat cable including a backbone to receive the end of the flat cable. A backbone protrudes from the rotor cover at a first connection location and a second connection location. The backbone including parallel channels for positioning the conductors of the flat cable. Conductors welded to uninsulated end portions of external wires and secured by a back bone cover having a strain relief means. An automatic unlocking means included in the rotor cover. The unlocking means includes a depressed or unlocked position and an undepressed or locked position. Upon assembly of the clockspring onto a steering column, the unlocking means is depressed disengaging a detente of the locking means from the recess of the housing allowing the rotor top to rotate. Further, an externally exposed locking means limits rotation of the rotor cover to 350° and may be permanently removed after assembly of the clockspring to a steering assembly.

16 Claims, 6 Drawing Sheets

TWO-PIECE CLOCKSPRING WITH LOCK AND WIRE HARNESS ASSEMBLY

BACKGROUND OF THE INVENTION

This invention pertains to a clockspring interconnector for enclosing an electrical conductor cable, the clockspring interconnector electrically connecting a rotatable electric device with a stationary electric device.

An increasing number of automobiles have air bag crash systems. An air bag is typically located on the steering wheel facing the driver. The air bag must be in continuous electrical connection with sensors in the car body. The sensors provide an electrical signal to the air bag crash assembly which instantly inflates the air bag in the event of a crash.

Accordingly, there is a need for an electrical connection between the rotatable potion of the air bag assembly which is mounted to the steering wheel, and the remaining portion of the assembly, which is in a stationary position in the car body. Electrical connections between rotatable and stationary parts are well known. Typically, an electrical brush rests upon a conductive ring, with one of the parts being rotatable to provide such rotatable electrical connection. However, there is a risk, particularly during the impact of an accident, of a transient failure of electrical connection with a brush and ring system, which would result in failure of the entire air bag system crash assembly.

Accordingly, a clockspring interconnector has been previously developed, comprising an outer housing, a rotor member and multiple intermediate housing members for enclosing and connecting the members; the housing and rotor member rotatably associated with one another at a plurality of bearing surfaces. A "clockspring" is located inside the interconnector. The clockspring is a flat conductor cable and has two ends conductively attached to conductor wires which pass out of the interconnector to unite the air bag to the sensing device. The interconnector is mounted on the steering column, and the steering wheel may be rotated in either direction while a continuous, positive electrical connection is provided between air bag sensors via the clockspring interconnector.

While prior art clockspring interconnectors are effective to provide the necessary continuous electrical connection between an air bag or other device on a rotating column and a stationary portion of a circuit, the prior art systems were sometimes wound completely tight before the device was installed making the installed device useless. This problem was partially solved by providing a clockspring assembly with a device that kept the clockspring interconnector from rotating prior to installation.

Such a locking mechanism was described in U.S. Pat. No. 4,722,690. That patent describes a clockspring interconnector which includes a projection which engages a noncircular aperture of the rotor member to prevent the rotor member from rotating. This projection was removable by hand by reaching into the center aperture of the clockspring. This design is disadvantageous in that it requires a center aperture which is noncircular and also requires exposure of the center aperture on the clockspring so that an operator may grasp the projection for removal. In certain assembly operations of the clockspring to the steering wheel and steering column, it is sometimes impossible to remove such a locking projection which may become enclosed by a steering wheel housing or steering column housing. Thus, there is a need for a removable external locking means which may be exposed after assembly of the clockspring with a steering wheel housing and steering column housing. Such prior art locking mechanisms also required an additional locking mechanism to lock the steering column assembly prior to assembly of the clockspring assembly. Such an improved external locking means providing exposure after assembly could also eliminate the extra part for the steering column locking mechanism.

U.S. Pat. No. 5,171,157, describes a clockspring interconnector including spring-loaded locking pegs integral to the internal hub of the rotor. This patent describes locking pegs which may be depressed only upon engagement from above, providing direct vertical force onto the locking pegs. Such a design requires that a column being inserted through the center of such a clockspring have protruding portions which will project perpendicular to the path of insertion of the column into the clockspring and provide surfaces which will engage the locking pegs in a vertical direction. Such a system is disadvantageous because the hub being inserted into such a clockspring must be specially designed so that the protruding portions of the hub engage the locking pegs while still allowing complete mating insertion of the column through the clockspring and with the steering assembly. Accordingly, it is desired to have a locking means which may be engaged without the need of a specially design column.

U.S. Pat. No. 5,059,134, describes a connection location where the electrical conductors of the flat ribbon cable are serially connected to a connection conductor wires via the engagement of the uninsulated end portions of conductor wires against a clamping body which is surrounded by a protective sheath injection molded about the clamping body. This arrangement is both difficult and costly to assemble. In order to position the clamping body against the conductor wires and then injection mold the protective sheath about the clamping body, requires that this operation be done separately from the assembly of the flat cable within the clockspring housing. Accordingly, an improved structure is desired which allows for the simple, inexpensive and quick attachment of external conductor wires to the electrical conductors of the flat cable so that all assembly of the clockspring may occur prior to the attachment of the external cables.

Generally, clocksprings have been known to have been assembled having at least three components. U.S. Pat. No. 4,607,898, describes a clockspring having a first half and a second half which is a assembled by a face plate. The assembly of the clockspring having three or more parts is disadvantageous due to the need to manufacture and then assemble the multiple parts which is costly and time-consuming and the increased number of bearing surfaces which create noise. Accordingly, there is desired a clockspring which has only two parts and a single bearing surface and may be assembled together quickly and easily. Such an assembly including all of the above described advantages is possible by incorporating the structures of the present invention either in a single clockspring assembly or as individual components of separate clockspring assemblies.

It is an object of the present invention to overcome all of the disadvantages of the prior art clocksprings by incorporating a clockspring structure which provides a design which is quickly and inexpensively assembled.

It is another object of the present invention to provide a clockspring assembly which is immobile until it is attached to a standard steering column.

It is a further object of this invention to provide a clockspring assembly that becomes immobile once it is disengaged from a standard steering column shaft.

It is yet another object of this invention to provide a clockspring assembly which remains immobile after assembly to a steering column but after adjustments to the steering column are made and without disassembling the clockspring from within a steering housing and steering wheel, the clockspring may be mobilized.

It is a further object of the present invention to provide a two-piece clockspring which may be assembled quickly and easily.

It is another object of the present invention to provide a clockspring structure which allows for the complete assembly of the clockspring prior to attachment of external cables.

It is yet another object of the present invention to provide for a clockspring assembly which allows for the quick and easy attachment of external cables at the conclusion of the assembly of the clockspring itself.

SUMMARY OF THE INVENTION

The above objects and advantages are provided by a clockspring interconnector comprising a housing defining a chamber extending therethrough and a rotor cover attached to the housing. A coiled flat cable carded within the chamber surrounding the rotor cover. The flat cable having a first end attached to a first connector location of the rotor cover and a second end attached to a second connector location of the housing.

The rotor cover defines a central aperture having a top opening and a bottom opening. The external diameter of the aperture having integral flanges extending from the rotor cover adjacent to the bottom opening. The housing having a center hole having a rim at its external diameter. The flanges having angled surfaces to slide past the rim and a protruding surface to engage the rim of the housing and secure the rotor cover thereto.

The first and second end of the flat cable including a backbone to receive the end of the flat cable. The backbone protrudes from the rotor cover at a first connection location. The backbone protrudes from the housing at a second connection location. The backbone including parallel channels for positioning the conductors of the flat cable. The channels of the backbone are separated by ribs and positioning ribs. The ribs are adjacent to the conductors of the flat ribbon cable. The positioning ribs receive insulated wires having uninsulated end portions. The positioning ribs engaging the wires at an insulated portion. The wires being press fit between the positioning ribs and aligned with the conductors of the flat cable. The positioning ribs are heat staked sufficiently to deform the positioning ribs to trap the wire within the channels. The uninsulated end portion of the wire is welded to the conductors of the flat cable. A backbone cover is attached to the backbone. The backbone includes a gap running transverse to the channels. The backbone cover includes a rib. Upon attachment of the backbone cover to the backbone having the insulated wire inserted therein, the rib engages the insulated portion of the wire, pushing the wire into the gap. The backbone cover is secured to the backbone by placement of a rivet through the backbone cover and the backbone.

An automatic unlocking means is included in the rotor cover. The unlocking means includes a depressed or unlocked position and an undepressed or locked position. The locking device includes a compression spring which urges the locking assembly having a detente to engage a recess along the rim of the housing. Upon assembly of the clockspring onto a steering column, the unlocking means is depressed, disengaging the detente of the locking means from the recess of the housing allowing the rotor cover to rotate.

A locking means is provided having a latching body seated within a channel of the housing. A stop head protrudes from the latching body. The stop head engages a stop wing of the rotor top. The stop wing includes a neck portion. A narrow neck portion of the stop wing allows for rotation of the rotor cover in 350° and upon abutment of the stop head against the neck portion of the stop wing, the rotor cover is prohibited from making a full rotation. A pull tab is connected to the latching body and protrudes perpendicular to the sidewall of the housing. The pull tab includes an arm of sufficient length to allow for the pull tab to protrude sufficiently to be gripped subsequent to the assembly of the clockspring within a steering wheel housing and steering column housing. Pulling on the pull tab with sufficient force disengages the latching body from the channel of the housing and removes the stop head from its position, allowing the free rotation of the stop wing and rotor cover.

These and other features of the invention are set forth below in the following detailed description of the presently preferred embodiments.

DETAILED DESCRIPTION OF THE PRESENTLY PREFERRED EMBODIMENTS

Figure 1:
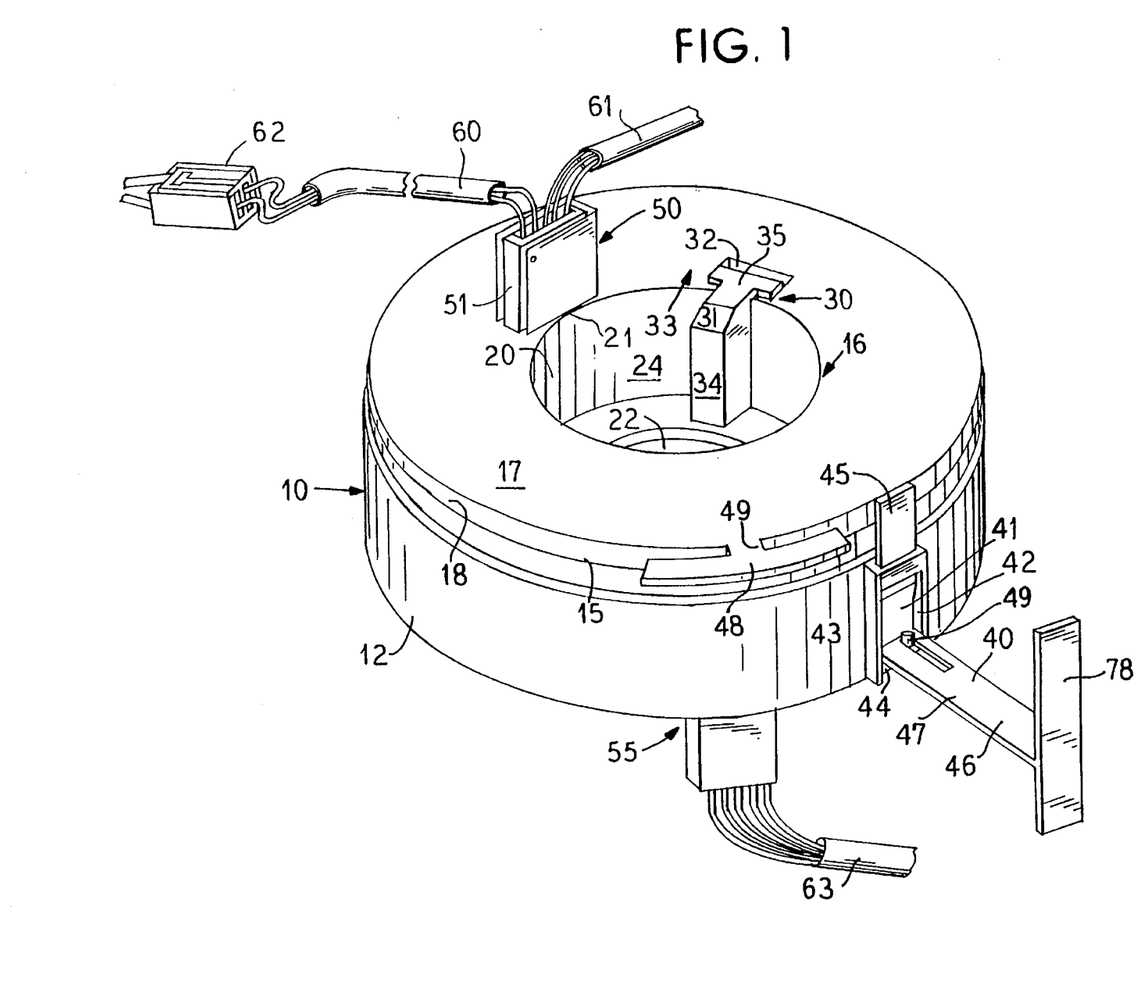
FIG. 1 is a perspective view of a clockspring.

The clockspring interconnector of this invention is better understood by references to FIGS. 1–14 which shows various aspects of a presently preferred clockspring interconnector. Turning to FIG. 1, the clockspring 10 includes a housing 12 having a sidewall 14. Enclosing the top of the housing 12 is the rotor cover 16. The rotor cover 16 combines the separate prior art components of a rotor and a cover into a single integral component. The rotor cover 16 includes flanges 25 (FIG. 4) which allow the rotor cover 16 to snap-fit onto the housing 12. Thus, the main components of the clockspring 10 are only the rotor cover and the housing 12. There are no other members needed to enclose the chamber 18 of the housing 12 and no other parts needed to hold the clockspring 10 together. This two-piece design minimizes costs by having only the two parts and the two components are quickly and easily assembled, saving in labor, storage and tooling costs. The unique design also includes a single bearing surface at the attachment means of the flanges because the top 17 of the rotor cover 16 is separated from the housing 12 by a gap 15 and does not bear together in this area.

The rotor cover 16 includes an aperture 20 having a top opening 21 and a bottom opening 22. The aperture includes an inner wall 24. Along the circumference of the inner wall 24 of the rotor cover 16 resides an automatic unlocking means 30 to provide for the unlocking of the rotor cover 16 allowing it to rotate freely on the housing 12. The automatic unlocking means 30 includes a button 35 having a sliding surface 31 and is received in cell 32. The button 35 is shown in its undepressed, locked position prior to assembly of the clockspring 10 to a steering assembly. Upon assembly to a steering assembly and insertion of section of steering wheel through aperture 20 of the rotor cover 16, the steering wheel will engage sliding surface 31 and force the button 35 to move in the direction of arrow 33, transverse to the direction of insertion of the steering wheel. Movement of the button 35 in direction of arrow 33 causes the button 35 to recede into the cell 32 causing the front surface 34 to become flush with the inner wall 24 of aperture 20. The movement of the button 35 in direction of arrow 33 also causes a detente 33 (FIG. 13) of button 35 to disengage from a recess of the housing 12 and allow for the rotor cover 16 to rotate freely from the housing 12.

This arrangement of the automatic unlocking means 30 allows for the shipping of the clockspring while it is in its locked position and prohibits the flat cable in the chamber 18 of the housing 12 from unwinding during shipping and causing the disalignment of the rotor cover 16 from the housing 12. In the assembled state of the clockspring with a steering mechanism, it is essential that the clockspring have at least two and a half turns in each direction. Thus, it is necessary that when the clockspring is assembled to the steering mechanism that it be centered. This ensures that there be enough turns necessary for the proper functioning of the clockspring. Failure to provide the assembly of a properly centered clockspring may cause the locking of the rotor cover or rupture of the flat cable of the clockspring when turned too far in one direction. In a preferred embodiment, the unlocking means 30 slidably engages and disengages in a direction transverse to the direction of the insertion of the steering wheel assembly. The unlocking means 30 also allows for the removal of the clockspring from the steering assembly for repairs while prohibiting the unwinding or uncentering of the rotor cover 16 in relation to the housing 12. Thus a repair worker may simply remove the clockspring 10 from the steering assembly which will cause the button 35 to disengage from cell 32 and its detente will engage the recess of the housing 12. This automatic unlocking means 30 ensures the rotor cover 16 is centered on the housing 12 at all times when the clockspring 10 is disassembled.

While the automatic unlocking means 30 provides for a means of preventing rotation throughout the life of the clockspring, a more temporary mechanism is the locking means 40. This locking means 40 must be manually removed and provides for locking of the clockspring 10 even after assembly to a steering assembly, when the unlocking means 30 is depressed and unlocked. However, this locking means 40 will be discussed in a separate context from the automatic unlocking means 30 in that it will be assumed that they will function independently of the other unless stated otherwise. The locking means 40 includes a latching body 41 which is seated within a channel 42 which is formed along the outer wall 14 of the housing 12. The locking means 40 is seated within the channel 42 by frictional engagement of a base portion 43 of the latching body to engage a sill 44 of the channel 42. Integral with the latching body 41 is a stop head 45 which protrudes above the plane of the rotor cover 16. The stop head 45 is oriented to engage a stop wing 48 integral with the rotor cover 16. The stop wing 48 includes a neck portion 49. Upon rotation of the rotor cover 16 in a counterclockwise direction, the neck portion 49 of the stop wing 48 will abut the stop head 45 of the locking means 40. The rotor cover 16 may also be rotated in the clockwise direction. However, the rotor cover 16 will be prohibited from making a full rotation in that the neck portion 49 of the stop wing 48 will abut the other side of the stop head 45 and inhibit further rotation. In a preferred embodiment of the invention, the neck portion 49 is sufficiently wide so that rotation is limited to 350°. The enlargement of the widths of the neck portion 49 decreases the amount of rotation that is allowed by the rotor cover 16. Inversely, the decreasing of neck portion 49 of the stop wing 48 will increase the degree of rotation that is allowed by the rotor cover 16. For example, another embodiment of this invention could provide a neck portion 49 which protrudes around 180° of the rotor cover 16. Thus, the rotor cover would only be allowed to rotate 180° before abutting the neck portion 49 of stop wing 48.

The amount of rotation necessary depends upon the assembly procedures required. In a preferred embodiment, the clockspring 10 is assembled onto a steering assembly in which the rotor cover 16 is enclosed in a steering wheel housing and the lower portion of the housing 12 is enclosed in a steering column housing. However, even after assembly of the clockspring 10 to a steering assembly, further assembly is required in some circumstances of the steering column to the drive mechanism. This assembly may require rotation of the steering column and in turn, the steering wheel assembly. In order to assemble a number of parts of the steering column, large degrees of rotation may be required for the easy assembly thereof. However, during this assembly, it is still essential that the clockspring remain centered. During such assembly of the steering column, it is possible that without a proper locking mechanism that the clockspring will become uncentered and be turned too far in one direction so that when the steering column mechanism is finally and completely attached, the clockspring will be out of alignment. As well, if the clockspring 10 includes an automatic unlocking means 30, as discussed above, the assembly of the clockspring will unlock the automatic locking means and allow full rotation of the rotor cover 16 upon the housing 12. In such a case, upon conclusion of the assembly and at operation of the steering wheel, it is likely that a turn in one direction will break the flat cable, while turning in the other direction would allow rotation well beyond two and a half turns. Thus, the engagement of the stop head 45 against the neck portion 49 of the stop wing 48 while prohibiting rotation of the rotor cover 16 beyond 360°, does allow for limited motion of the clockspring and steering assembly to which it is attached for the proper assembly of the steering column. Following such assembly and returning of the steering wheel to its centered position, the locking means 40 may then be removed. The above advantages are realized for the locking means 40 of a clockspring having both a locking means 40 and an automatic unlocking means 30 only where the steering mechanism is assembled after the clockspring is assembled to the steering column.

Pull tab 46 is provided which protrudes perpendicular from the side wall 14 of the housing 12. The pull tab 46 is positioned vertically on the side wall 14 so that it protrudes from a gap which exists when a steering wheel housing is assembled above it and a steering column housing is assembled below it. The length of the arm 47 of the pull tab 46 is dependent upon the overhang that the steering wheel housing and the steering column housing protrude from the clockspring 10. The pull tab 46 includes gripping portion 78 which allows for easy pulling of the pull tab 46 and removal of the locking means 40 from the channel 42. While finger 49 maintains the latching body 41 of the locking means 40 within the channel 42, upon pulling on the pull tab 46, the base portion 43 of the latching body will ride over the finger 49 and allow removal from the channel 42. Upon pulling of the pull tab 46, the stop head 45 will slide down the side wall 14 of the housing and follow the pull tab out and from between the gap created between the steering wheel housing and the steering column housing. Having removed the locking means 40, the clockspring 10 will be able to rotate freely. Once the locking means 40 is disengaged, it cannot be replaced within channel 42 and only provides a temporary locking feature.

The housing 12 defines chamber 18 which houses the flat cable. The flat cable is wound around the inner wall 24 of the rotor cover 16. The flat cable has a first end and a second end. In a preferred embodiment, the first end is connected to the rotor cover 16 at a first connection location 50. The first connection location 50 includes a backbone 51 which is inserted through passage 58 and protrudes beyond the top surface of the rotor cover 16. The first connection location 50 secures the conductors of the flat cable in an accessible orientation on the backbone 51. Upon complete assembly of the clockspring 10, external cables 60,61 may be attached quickly and easily to the backbone 51. The external cables 60,61 may attach to controls in the steering wheel or to a squibb connector 62 which connects to an igniter which activates the air bag. The second end of the flat cable is terminated at a second connection location 55 having a similar construction to the first connection location and having external wires 63 attached thereto which may attach to a sensing device or power source within the engine compartment of an automobile.

Figure 2:
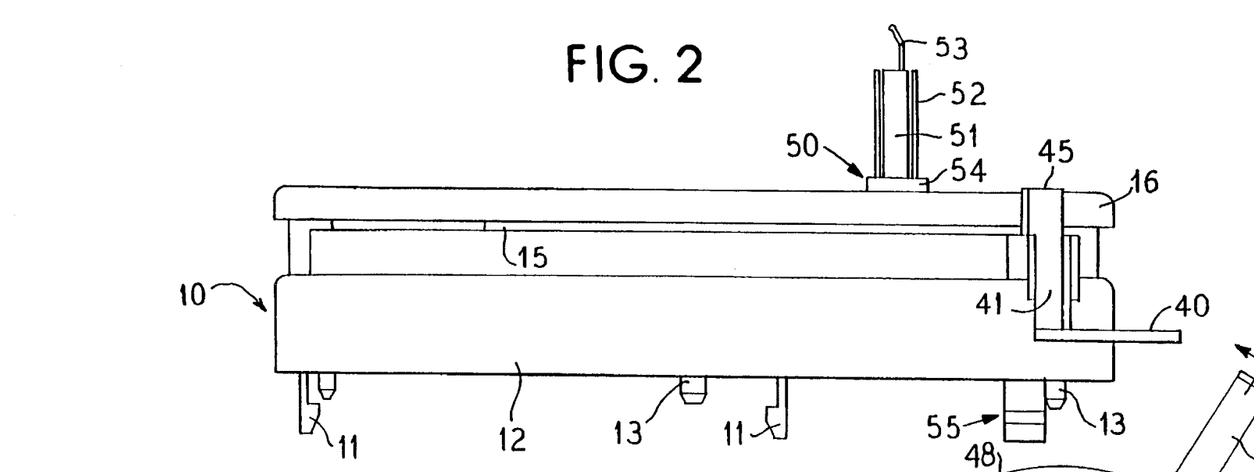
FIG. 2 is a side view of FIG. 1.

Turning to FIG. 2, a side elevation of the clockspring 10 of FIG. 1 is shown. The top rotor cover 16 is shown attached to the housing 12. It can be seen that there is a gap 15 which is present between the housing 12 and the rotor cover 16. Assembly of the clockspring 10 having the gap 15 allows for rotation of the rotor cover 16 on the housing 12 without having a surface for rubbing which may cause excessive noise or friction. The gap 15 reduces greatly the amount of beating surfaces and provides for a much easier rotation of the clockspring 10. First connection location 50 is shown having backbone 51 enclosed by backbone cover 52 and having wires 53 leaving therefrom. A lip 54 is shown which is formed integral with the rotor cover 16 and provides for a surface for the backbone cover 52 to slide into for securement around the backbone 51. Locking means 40 is shown having latching body 41 and stop head 45. Second connection location 55 is shown where the second end of the flat cable is terminated. Integrally formed with the housing 12 are snap legs 11 which provide for the snap mounting of the housing to a steering column housing. Locator pegs 13 also help mount the housing 12 to a steering column housing.

Figure 3:
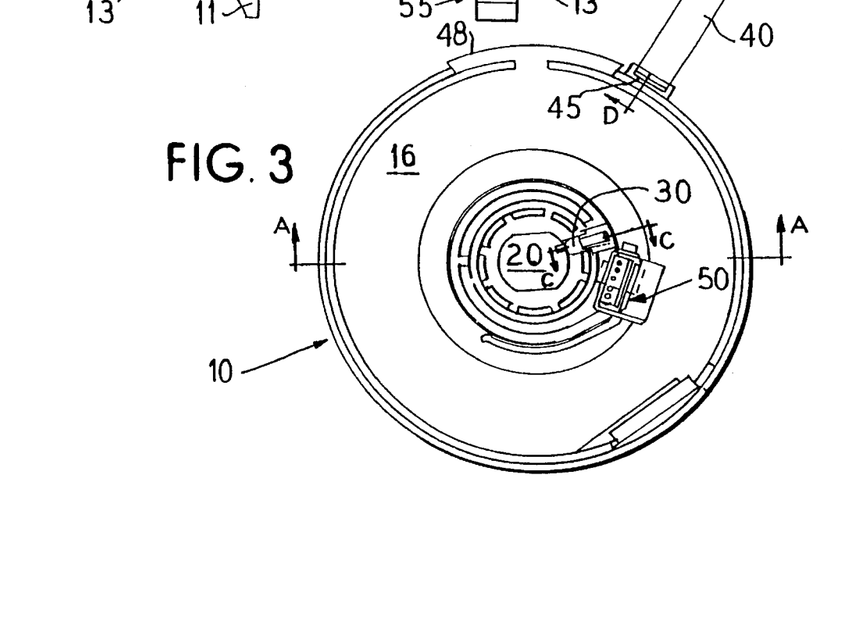
FIG. 3 is a top view of FIG. 1.

Turning to FIG. 3, a top view of a clockspring 10 is shown. Rotor cover 16 includes aperture 20. The rotor cover 16 has formed thereon the first connection location 50 and the automatic unlocking means 30. Locking means 40 is shown attached to housing 12. The stop wing 48 is integrally formed with the rotor cover 16 to engage stop head 45.

Figure 4:
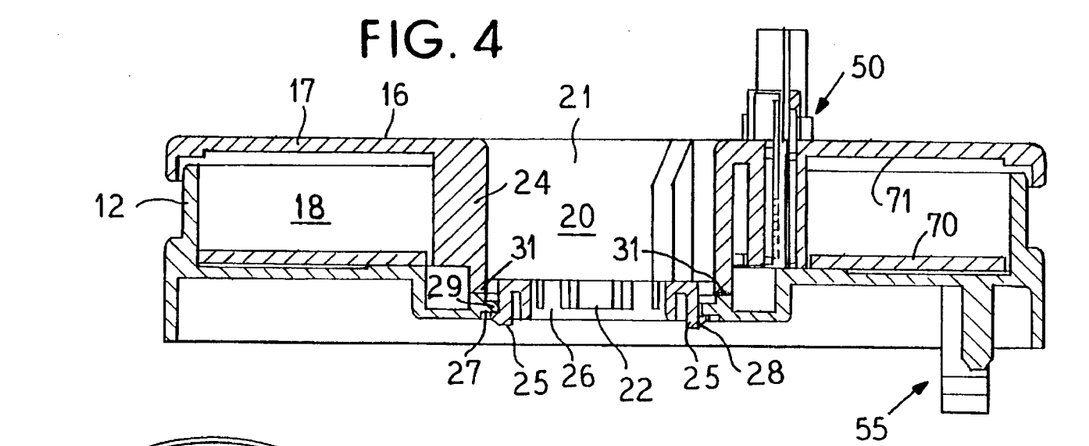
FIG. 4 is a cut-away, side elevation view of FIG. 3 taken at line A—A.

Turning to FIG. 4 a cut-away, side elevation view of FIG. 3 taken at line A-A is shown. In a preferred embodiment, rotor cover 16 is assembled directly to the housing 12. The housing defines a chamber 18 in which the flat cable 65 (FIG. 9) is housed. The rotor cover 16 forms an aperture 20. The aperture 20 includes a top opening 21 and a bottom opening 22. The rotor cover 16 includes a top 17 and integral thereto an inner wall 24. The inner wall 24 at its exterior surface defines the aperture 20 and on its interior surface provides the rotor which the clockspring is wound about. Integral to the inner wall 24 are flanges 25.

The housing 12 includes a center hole 26 into which the inner wall 24 and aperture 20 of the rotor cover 16 is inserted. Protruding from the center hole 26 of the housing 12 is a rim 27. The engagement of the flanges 25 of the rotor cover 16 with the rim 27 of the housing 12 provides for the attachment of the rotor cover to the housing 12. The flanges 25 include angled surfaces 28 and protruding surfaces 29. The rotor cover 16 is formed of a polymer material which is hard but flexible. Upon insertion of the flanges into center hole 26 of the housing, the angled surface 28 of the flanges 25 of the rotor cover 16 abut the upper surface of the rim 27. The flanges are stressed inwardly and slide past the rim 27. Upon full insertion of the flanges into the center hole of the housing 12, the flanges snap outwardly engaging protruding surface 29 under rim 27. In a preferred embodiment, eight flanges are present around the bottom opening 22 of the rotor cover 16 providing engagement points at each 45° position around the rim 27 of the housing 12. Such an assembly provides for the permanent connecting of the rotor cover 16 to the housing 12 and also allows for the smooth rotation of the rotor cover 16 on the housing 12. However, as few as four flanges may provide such functions as well. Shoulders 31 of the rotor cover 16 provide for a tight fit and eliminate any wobbling upon mating of the rotor cover 16 with the housing 12. The shoulder 31 of the rotor cover 16 and rim 27 of the housing 12 are the only beating surfaces of the present invention providing for low noise upon rotation of the rotor cover 16 against the housing 12.

Within the chamber 18 of the housing 12 are included insulating material 70. This insulating material 70 provides for a surface of the flat cable to rub against. Upon rotation of the rotor cover 16 and movement of the flat cable, the rubbing and noise created by the rotation of the flat cable will be reduced. In a preferred embodiment, the insulating material is a mat finished vinyl foam tape (Great lakes Tape & Label, Inc.) having a cellular, flexible polyvinyl chloride $(CH_2—CHCL)_n$ foam composition. The vinyl foam tape includes an acrylic adhesive on one side so that it may easily be attached to the housing. Such insulation may also be attached to the underside 71 of the rotor cover 16. The sound dampening that the insulating material provides is partly due to the rough surface of the insulating material 70 which the flat cable rubs against. Also, first connection location 50 and second connection location 55 are shown.

Figure 5:
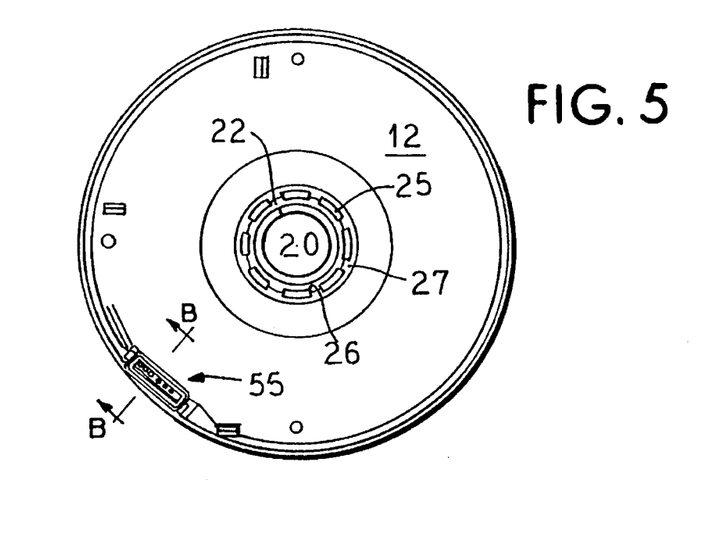
FIG. 5 is a bottom view of FIG. 1.

FIG. 5 discloses a bottom view of the clockspring of FIG. 1. Housing 12 is shown having center hole 26. The bottom opening 22 of the aperture 20 of the rotor cover having integral flanges 25 snapped over the rim 27 of the housing 12. Second connection location 55 is shown.

Figure 6:
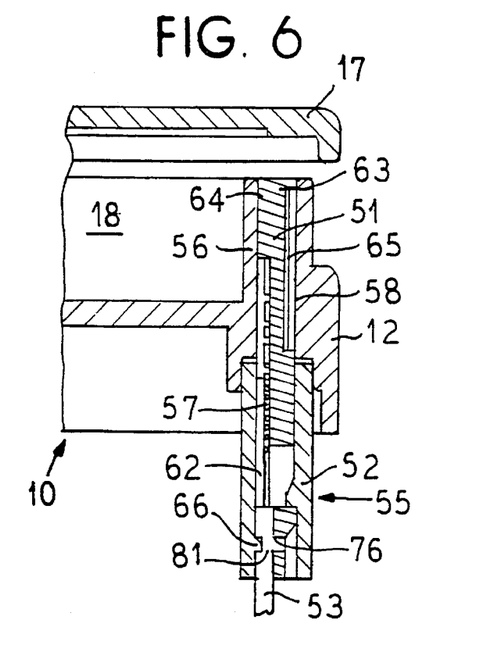
FIG. 6 is a cut-away, side elevation view of FIG. 5 taken at line B—B.

Turning to FIG. 6, a cut-away, side elevation view of the second connection location taken at line B—B of FIG. 5 is shown. FIGS. 6–11 all show a preferred embodiment of a wire harness connector which terminates the end of the flat ribbon cable and allows for easy and quick attachment of external cables at the connection locations. The discussion of FIGS. 6–11 and the second connection location 55 also equally apply to the structure of the first connection location 50 and such structure can be interchanged at both locations. Second connection location 55 is located at the base of housing 12 adjacent to sidewall 14. The top 17 of rotor cover 16 is shown above the housing 12. The housing 12 forms a chamber 18 in which the flat conductor cable is wound around the inner wall of the rotor cover 16. The flat cable includes a first end terminating at the first connection location at the rotor cover and a second end terminating at the second connection location at the housing 12.

The second connection location 55 consists of a backbone 51. In a preferred embodiment, the backbone 51 includes a first side 63 and a second side 64. The second end portion of the flat ribbon cable 65 is received at the first side 63 of the backbone 51. The end portion 65 of the flat ribbon cable approaches the backbone 51 from a transverse direction. It meets the backbone 51 at the first side 63 and is then folded around the backbone 51 onto the second side 64 of the backbone 51. The flat cable 56 is then folded down at an angle to form a change in the longitudinal direction of the flat cable 56 of approximately 90° so that the end portion 56 of the flat cable is travelling parallel to the direction of the backbone 51.

Extending from the end portion 56 of the flat ribbon cable are electrical conductors 57 which are uninsulated and extend from the latex coating of the end portion of the flat cable 56. The conductors 57 are carried within channels 71 (FIG. 9) of the backbone 51. The backbone includes pins 73 (FIG. 9) to retain and hold the flat ribbon cable in place. The steps of securement of the flat ribbon cable to the backbone in order to terminate the flat ribbon cable are all that occur during the assembly of the clockspring 10. The simple and quick procedure of terminating the flat cable to the backbone as described above and inserting the backbone into the passage 58 of the housing are all the assembly required. The further assembly of the clockspring may occur without having to attach exterior cables to the clockspring. Thus, the clockspring 10 may be handled easily and quickly without having the excess and cumbersome external wires and harnesses inhibiting the quick handling of the clockspring 10 on an assembly line. As the harness assembly is also a complicated and timely process, it is helpful to be able to complete such an assembly separate from the clockspring and also have the advantages of completing these assemblies without having the clockspring attached thereto, causing the cumbersome and timely handling. Simply by terminating the flat cable to the backbone 51 and having the backbone protrude from the housing exposing the conductors 57 for future attachment of exterior cables is a great cost saving measure.

Upon complete assembly of the clockspring 10 and assembly of the rotor cover 16 to the housing 12, the exterior cables may then be attached. The exposed conductors 57 of the flat cable are attached quickly and easily to external cables by feeding the insulated wires 53 into the channels of the backbone 51. Ribs between the channels guide the insulated portions of the wires 53 into the channels. The uninsulated wires 62 are placed adjacent to the conductors 57. The wires 53 are then secured to the backbone 51 and the uninsulated wires 62 are soldered to the conductor 57 as will be described in more detail below. A backbone cover 52 is attached to the backbone 51 to protect the terminated conductor and attached wires 53. The backbone cover 52 also includes a rib 66 which engages the insulated wires 53 at point 81. The rib 66 forces the insulated wires 53 into gap 76 and deforms the insulated wires 53 with four bends of 90°. The engagement of the rib 66 with the insulated wire provides a strain relief means to inhibit the insulated wires 53 from being pulled from the backbone 51.

Figure 7:
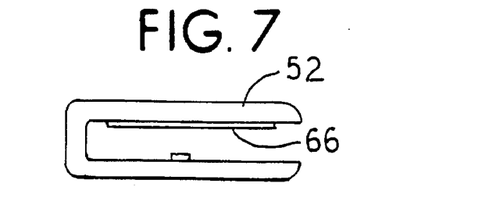
FIG. 7 is an end view of a backbone cover.
Figure 8:
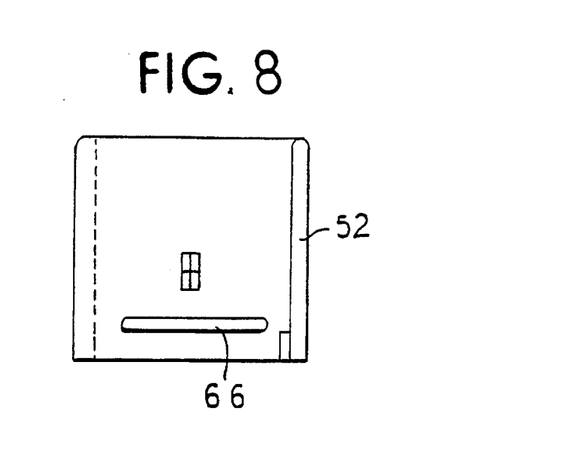
FIG. 8 is a side elevation view of a backbone cover.

Turning to FIG. 7, the backbone cover 52 is shown having rib 66. The backbone cover 52 slides over the backbone and the rib 66 abuts and compresses the insulated wires to provide a strain relief mechanism. FIG. 8 is a side elevation view of the backbone cover 52 having rib 66.

Figure 9:
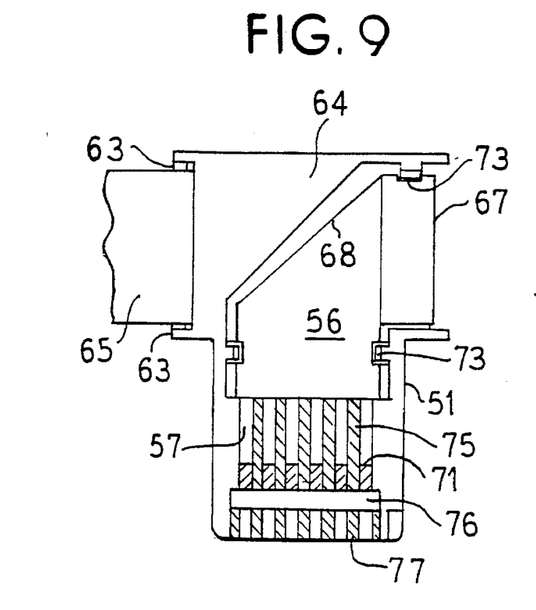
FIG. 9 is a top view of a backbone.

Turning to FIG. 9, the backbone 51 is shown having its second side 64 exposed. An end portion 65 of the flat ribbon cable is inserted at a first side 63 of the backbone 51. The flat ribbon cable is placed onto the backbone 51 at the first side 63 at an angle transverse to the length of the backbone 51. The flat cable 65 is folded around the backbone 51 onto the second side 65 at a first fold 67. A second fold 68 is made at an angle in which the end portion 56 of the flat cable is folded over on itself and redirects the flat ribbon cable in a 90° turn so that the end portion 56 is then directed parallel to the length of the backbone 51.

Channels 71 are integrally molded into the second side 64 of the backbone 51. The conductors 57 of the flat cable 56 are inserted into the channels 71. The flat cable is retained on the backbone 51 via pins 73 which protrude from the sides of the backbone and under which the flat cable 56, 65 is positioned. By the positioning of the flat cable 56, 65 under the pins 73 of the backbone 51 and the folding of the flat cable at first fold 67 and second fold 68, the flat cable becomes securely attached to the backbone 51. This assembly of the flat cable terminated onto the backbone is all that is required for the assembly of the clockspring itself. The assembled backbone may then be inserted into the passage 58 of the housing 12. The use of the backbone 51 allows for the simple termination of the flat cable 56, 65 without the need to immediately attach exterior cables to the flat cable. The present invention allows for the subassembly of the rotor cover, housing, inside diameter connector, outside diameter connector and flat cable separate from the harnesses to be attached at a final operation. The clockspring 10 may then continue to be assembled without having to attach cumbersome exterior cables and harnesses.

The backbone 51 includes channels 71 which are separated by ribs 75. A groove 76 is also integrally molded into the backbone 51 and provides for an area into which the insulated wires may be depressed upon attachment of the backbone cover. Positioning ribs 77 are located at the end of the backbone 51 and are of a sufficient width so that an insulated wire 53 (FIG. 10) may be press fit between the positioning ribs 77. These positioning ribs 77 will also be melted by contact with a heat stake to secure the inserted wires in the channels 71.

Figure 10:
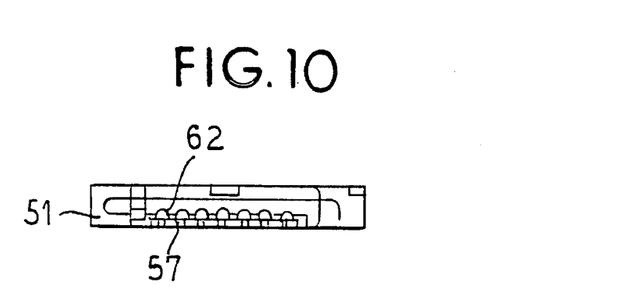
FIG. 10 is an end view of an assembled backbone.
Figure 11:
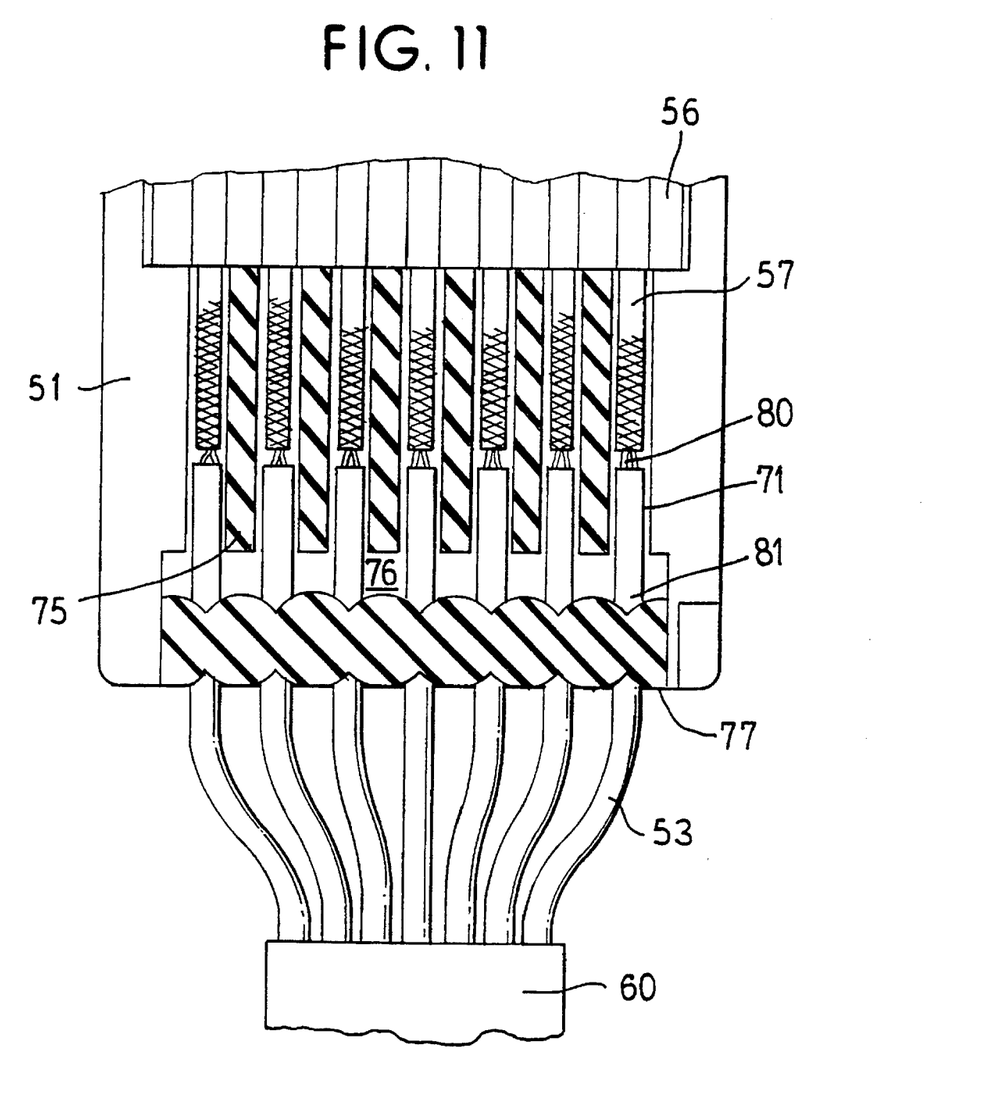
FIG. 11 is an enlarged top view of an assembled backbone.

FIG. 10 is an end view of a completely assembled backbone 51 having conductors 57 attached to uninsulated wires 62. Turning to FIG. 11, a top view of a completely assembled backbone 51 is shown having a flat cable 56 with uninsulated conductors 57 protruding from the flat cable 56 into channels 71. After a clockspring is completely assembled, the external harness 60 will be attached to the clockspring by aligning the individual insulated wires 53 in the channels 71. The insulated wires 53 are inserted between the ribs 75 and positioning ribs 77 and the uninsulated wires 80 are aligned with the conductors 57 of the flat cable 56.

The insulated wires are press fit between the positioning ribs 77 and are held in place to the backbone 51 therein. The positioning ribs 77 are then melted by contact with a heat stake which forms a homogeneous layer above the insulated wires 53, closing the opening above the insulated wires 53 adjacent the positioning ribs 77 and securing the wires within the channels 71.

In a preferred method of attaching the wires 53 to the conductors 57 of the flat cable 56, the uninsulated wires 80 are ultrasonically welded to the conductors 57. A backbone cover 52 is then slid over the backbone 51 to protect the terminated and connected ends of the conductors and wires. The backbone cover 52 includes a rib 66 which abuts the insulated wires 53 at area 81 and compresses the wire into groove 76 causing the insulated wire 53 to deform as shown in FIG. 6. Because the engagement of the rib 66 against the wires 53 occurs at the insulated area of the wire 53, a strain relief function is created. The backbone cover 52 is secured to the backbone 51 by any means. In a preferred embodiment, a rivet is used to secure the backbone cover. It is anticipated by this invention that the specific termination means and method described herein is only by way of an example and other specific components and methods are also covered.

Figure 12:
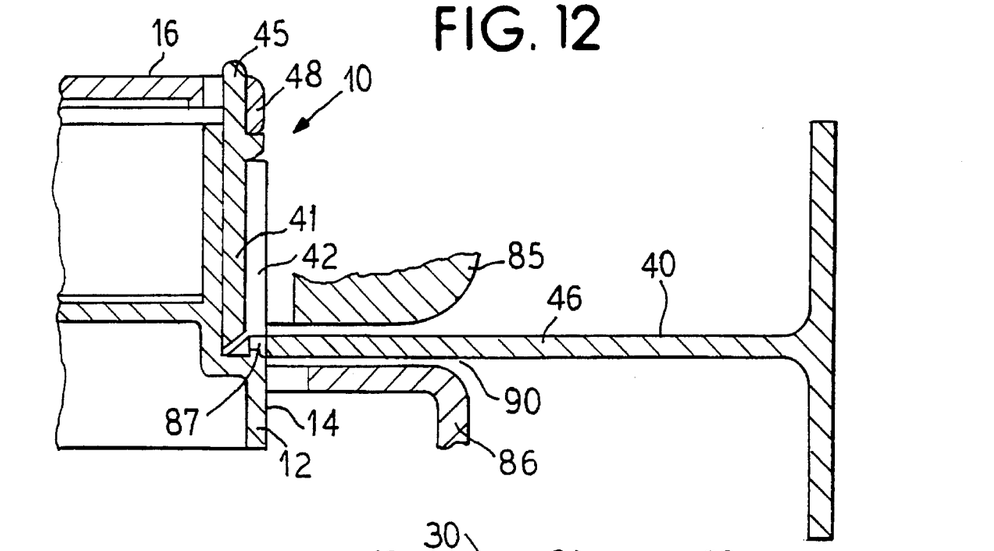
FIG. 12 is a cut-away, side elevation of FIG. 3 taken at line D—D.

Turning to FIG. 12, a side elevation cut-away view taken at line D—D of FIG. 3 is shown. The clockspring 10 includes the rotor cover 16 and housing 12. The locking means 40 is shown protruding from a clockspring 10 assembled within a steering wheel housing 85 and a steering column housing 86. The locking means 40 has pull tab 46 protruding perpendicularly from the housing 12 at a point 87 along the sidewall 14 of the housing 12 which is specifically oriented to be below the steering wheel housing 85 and above the steering column housing 86. Upon assembly of the clockspring within these housings 85,86, a gap 90 is formed through which the pull tab 46 protrudes. The pull tab 46 is integrally connected to the latching body 41 which is seated within channel 42. A stop head 45 is integral to the latching body 41 protrudes beyond the plane of the rotor cover 16. A stop wing 48 engages the stop head 45 and limits the rotor cover 16 from rotating beyond 350°.

Figure 13:
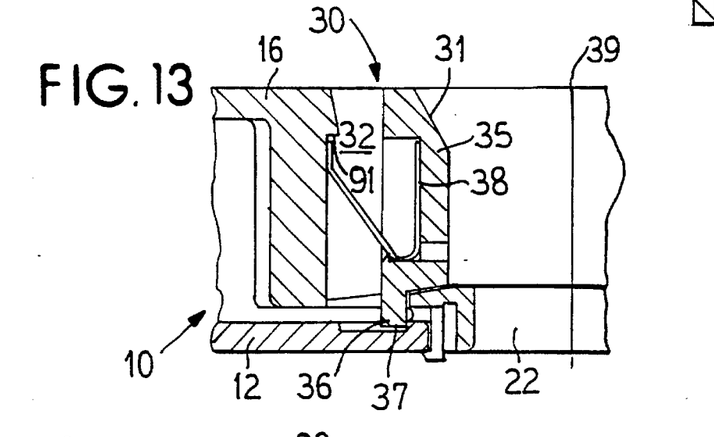
FIG. 13 is a cut-away, side elevation view of FIG. 3 taken at line C—C.

Turning to FIG. 13, the automatic unlocking means 30 is shown. The unlocking means 30 is shown in its undepressed locked position. The drawing shows a cut-away, side elevation view of FIG. 3 taken at line C—C. A button 35 includes a sliding surface 31 and a detente 36. The button 35 is positioned adjacent to the bottom opening 22 of the rotor cover 16 and within cell 32. U-shaped spring member 38 forces the button 35 towards the center 39 of the clockspring 10. The spring member 38 abuts tab 91 which retains the spring member 38 and button 35 within cell 32. In its locked position, the detente 36 is forced into a recess 37 of the housing 12. The sides of the detente 36 engage the inner walls of the recess 37 and prevent the rotation of the rotor cover 16 in association with the housing 12. In a preferred embodiment, the detente 36 includes beveled edges engaging correspondingly tapered walls of the recess 37. The beveled edges ensure that the detente 36 will not disengage from the recess 37. Further, the recess is widely spaced allowing gaps on either side of the detente 36 so that even upon engagement of the detente 36 within recess 37, minor rotation of 10° (5° in each direction) of the rotor cover 16 is allowed.

Figure 14:
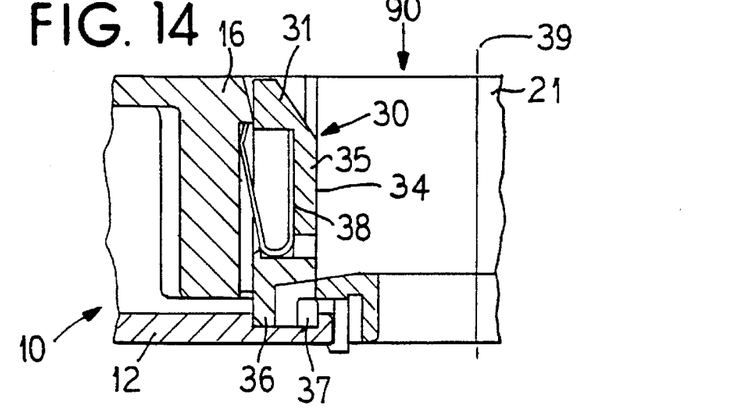
FIG. 14 is a cut-away, side elevation cut-away view of FIG. 3 taken at line C—C.

Turning to FIG. 14, the button 35 is shown in its depressed and unlocked position. Upon assembly of the clockspring 10 into a steering assembly, a steering wheel section (not shown) will be inserted into the top opening 21 of the rotor cover 16 in the direction of arrow 90 and it will abut the sliding surface 31 of the button 35. The further insertion of the steering wheel within the clockspring 10 will cause the button 35 to move away from the center 39 and the steering wheel section will slide along the front surface 34 of the button 35, depressing the spring member 38 and moving the button into cell 32 and detente 36 out of recess 37 of the housing 12. The removal of detente 36 from recess 37 allows the rotor cover 16 to rotate freely about the housing 12. Thus, the assembly of the clockspring to a steering assembly engages the automatic unlocking means 31 allowing it to rotate freely.

The description above has been offered for illustrative purposes only, and it is not intended to limit the scope of the invention of this application which is defined in the following claims.

What is claimed is:

1. A clockspring interconnector comprising:

a housing defining a chamber;

a rotor cover attached to said housing;

a flat conductor cable coiled within said chamber having a first end and a second end;

said first end attached to said rotor cover;

said second end attached to said housing;

an aperture at the center of said rotor cover having a bottom opening;

an attachment means integral to said rotor cover adjacent to said bottom opening attaching said rotor cover to said housing an automatic unlocking means provides the free rotation of said rotor cover upon insertion of a steering wheel assembly providing movement of said unlocking means transverse to the path of insertion of the steering wheel assembly.

2. The clockspring interconnector of claim 1 wherein:

said attachment means includes flanges;

a rim adjacent said bottom opening; and said flanges engaging said rim to attach said rotor cover to said housing.

3. The clockspring interconnector of claim 1 wherein:

said chamber having on at least one surface an insulating material of vinyl foam tape.

4. The clockspring interconnector of claim 3 wherein:

said insulating material includes a cellular, flexible polyvinyl chloride foam composition.

5. The clockspring interconnector of claim 1 including:

uninsulated conductors extending from said flat cable;

a connection location having said flat conductor cable attached thereto wherein said conductors of said flat cable are exposed beyond a plane of said rotor cover.

6. The clockspring interconnector of claim 5 including:

a first connection location of said rotor cover having said first end of said flat cable attached thereto and a second connection location having said second end of said flat cable attached thereto.

7. The clockspring interconnector of claim 5 wherein:

said connection location includes a backbone; and said backbone having channels for receiving respective ones of said conductors and pins for mounting said flat cable thereto.

8. The clockspring interconnector of claim 7 wherein:

said connection location includes a backbone cover having a strain relief means.

9. The clockspring interconnector of claim 1 wherein:

said unlocking means includes a button having a depressed, unlocked position and an undepressed, locked position.

10. The clockspring interconnector of claim 9 including:

an inner wall of said rotor cover defining an aperture;

said button having a U-shaped spring member therein and a detente engaging a recess of said housing; and said button slidable transversely to said inner wall.

11. The clockspring interconnector of claim 1 including:

a locking means preventing the rotation of the rotor cover relative to the housing more than 350°, having a pull tab which is exposed following assembly of the clockspring to a steering assembly.

12. The clockspring interconnector of claim 9 wherein:

said locking means includes a latching body seated within a channel of said housing;

a pull tab protruding perpendicular to said latching body;

a stop head protruding beyond the plane of the rotor cover and engaging a stop wing of the rotor cover; and a gripping portion.

13. The clockspring interconnector of claim 12 wherein:

said latching body, pull tab and stop head are integrally connected.

14. The clockspring interconnector of claim 13 wherein:

removal of said latching body by pulling on said pull tab allows said rotor cover to rotate beyond a single turn.

15. The clockspring interconnector of claim 1 wherein:

said attachment means is the only bearing surface between said rotor cover and said housing.

16. A clockspring interconnector comprising:

a housing defining a chamber;

a rotor cover attached to said housing a flat conductor cable coiled within said chamber having a first end and a second end;

said first end attached to said rotor cover;

said second end attached to said housing;

an aperture at the center of said rotor cover having a bottom opening;

an attachment means integral to said rotor cover adjacent to said bottom opening attaching said rotor cover to said housing;

uninsulated conductors extending from said flat cable;

a connection location having said flat conductor cable attached thereto wherein conductors of said flat cable are exposed beyond it plane of said rotor cover;

said connection location includes a backbone; and said backbone having channels for receiving said conductors and pins for mounting said flat cable thereto.

* * * * *

UNITED STATES PATENT AND TRADEMARK OFFICE
CERTIFICATE OF CORRECTION

PATENT NO. : 5,460,535
DATED : October 24, 1995
INVENTOR(S) : Patrick A. Bolen

It is certified that error appears in the above-indentified patent and that said Letters Patent is hereby corrected as shown below:

Title page, item [57] Abstract, line 3, delete "carded" and insert carried.
Column 1, line 18, delete "potion: and insert portion.
Column 3, line 25, delete "carded" and insert carried.
Column 5, line 5, delete "beating" and insert bearing.
Column 6, line 40, delete "pans" and insert parts.
Column 7, line 53 and column 8, line 43, delete "beating" and insert bearing.
Column 12, Claim 1, line 29, after "said housing", insert-- and Also, begin begin a new paragraph at "an automatic unlocking means--"
Column 14, Claim 16, line 18, delete "it" and insert a.

Signed and Sealed this

Thirtieth Day of January, 1996

BRUCE LEHMAN

Attest:

Attesting Officer

Commissioner of Patents and Trademarks